United States Patent Office 3,842,173
Patented Oct. 15, 1974

3,842,173
PHARMACEUTCAL COMPOSITIONS AND METHODS OF INHIBITING GASTRIC ACID SECRETION
Martin Brenner, Upper Darby, and Bernard Loev, Broomall, Pa., assignors to Smithkline Corporation, Philadelphia, Pa.
No Drawing. Continuation-in-part of application Ser. No. 236,593, Mar. 21, 1972, now Patent No. 3,740,409. This application Mar. 30, 1973, Ser. No. 346,489
Int. Cl. A61k 27/00
U.S. Cl. 424—263
10 Claims

ABSTRACT OF THE DISCLOSURE

Pharmaceutical compositions and methods of inhibiting gastric acid secretion by administering 2-amino(and 2-aminomethyl)-2-heterocyclic-thioacetamides.

---

This application is a continuation-in-part of Ser. No. 236,593, filed Mar. 21, 1972, now U.S. Pat. 3,740,409.

This invention relates to new 2-amino(and 2-aminomethyl)-2-heterocyclic-thioacetamide compounds having pharmacological activity. In particular, these compounds inhibit gastric acid secretion.

The compounds of this invention are represented by the following formula:

FORMULA I

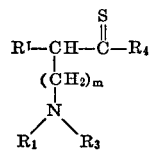

in which:

$m$ is 0 or 1;

$R_1$ is a 2-pyridyl-2-pyrimidyl, 4-pyrimidyl, 2-pyrazinyl, 2-pyrrolyl, 2-quinolyl, 2-thiazolyl or 4-thiazolyl ring, said rings being optionally substituted by halogen, lower alkyl or lower alkoxy;

$R_2$ and $R_3$ are lower alkyl or taken together with the nitrogen atom to which they are attached from a piperidino, pyrrolidino or N-lower alkylpiperazino ring;

$R_4$ is

or NH—$(CH_2)_n$-cycloalkyl, said cycloalkyl having 3–6 carbon atoms;

$R_5$ and $R_6$ are hydrogen or lower alkyl and $n$ is 0 or 1;

This invention also includes pharmaceutically acceptable acid addition salts of the compounds of Formula I.

Preferred compounds of this invention are represented by Formula I in which $R_1$ is 2-pyridyl, $R_2$ and $R_3$ are methyl or ethyl or taken together with the nitrogen atom to which they are attached form a piperidino or pyrrolidino ring and $R_4$ is $NH_2$, NH-(lower alkyl), NH-cyclopropyl, NH-cyclobutyl, NH—$CH_2$-cyclopropyl or NH—$CH_2$-cyclobutyl.

Advantageous compounds of this invention are represented by Formula I in which $R_1$ is 2-pyridyl, $R_2$ and $R_3$ are methyl and $R_4$ is $NH_2$, NH-methyl, NH-cyclopropyl, NH - cyclobutyl, NH—$CH_2$-cyclopropyl or NH—$CH_2$-cyclobutyl.

The compounds of this invention produce inhibition of gastric acid secretion. This activity is demonstrated by administration to pylorus ligated rats at doses of about 50 mg./kg. orally. Also, this activity is demonstrated by administration to chronic gastric fistula rats (Brodie et al., Amer. J. Physiol, 202:812–814, 1962) at doses of about 50 mg./kg. orally. In these procedures, compounds which produce an increase in the gastric pH or a decrease in the volume of gastric juice or both are considered active.

The compounds of this invention are prepared by the following procedures:

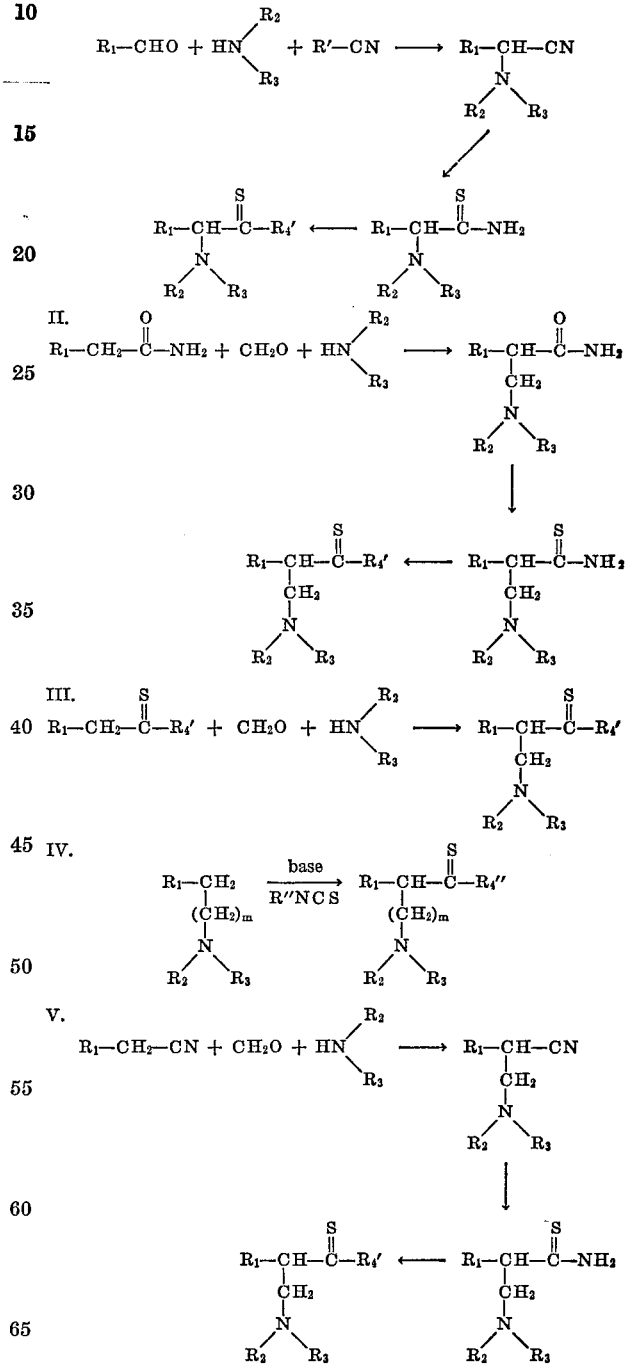

The terms $m$, $R_1$, $R_2$ and $R_3$ are as defined above, $R'$ is an alkali metal, $R''$ is lower alkyl or $(CH_2)_n$-cycloalkyl, $R'_4$ is NH-(lower alkyl), N(lower alkyl)$_2$ or NH—$(CH_2)_n$-cycloalkyl, $R''_4$ is NH-(lower alkyl) or NH—$CH_2)_n$-cycloalkyl, and cycloalkyl groups having 3–6 carbon atoms and $n$ is as defined above.

According to procedure I, a heterocyclic-carboxaldehyde, an amine and an alkali metal cyanide are reacted, preferably in the presence of acid, to give a 2-amino-2-heterocyclic-acetonitrile which is converted to a 2-amino-2-heterocyclic-thioacetamide of this invention by reacting with hydrogen sulfide in the presence of a base such as an amine or by reacting with ammonium polysulfide. The N-substituted thioacetamides of this invention are prepared by reacting the N-unsubstiuted compounds with the appropriate amine.

According to procedure II, a 2-heterocyclic-acetamide is reacted with an equimolar amount of formaldehyde and an equimolar amount of an amine to give a 2-aminomethyl - 2 - heterocyclic-acetamide which is treated with phosphorus pentasulfide to give a 2-aminomethyl-2-heterocyclic-thioacetamide of this invention. Reacting with an appropriate amine gives the corresponding N-substituted thioacetamides of this invention.

By procedure III, a 2-heterocyclic-N-substituted-thioacetamide is reacted with an equimolar amount of formaldehyde and an equimolar amount of an amine to give the corresponding 2-aminomethyl compounds of this invention.

Accordingly to procedure IV, an aminoalkyl-heterocycle is reacted with strong base such as butyl or phenyl lithium and then with an appropriate isothiocyanate to give N-substituted thioacetamides of this invention.

According to procedure V, a 2-heterocyclic-acetonitrile is reacted with formaldehyde and an amine to give a 2-aminomethyl - 2 - heterocyclic - acetonitrile which is converted to a 2 - aminomethyl - 2 - heterocyclic-thioacetamide of this invention by reacting with hydrogen sulfide in the presence of a base such as an amine or by reacting with ammonium polysulfide. To prepare the N-substituted compounds of this invention, the N-unsubstituted thioacetamides are reacted with the appropriate amine.

Alternatively, the 2 - aminomethyl - 2 - heterocyclic-acetamide intermediate in procedure II may be prepared by reacting a lower alkyl ester of a 2-heterocyclic-acetic acid with formaldehyde and an amine and reacting the resulting lower alkyl ester of a 2-aminomethyl - 2 - heterocyclic-acetic acid with ammonia. The 2 - aminomethyl-2-heterocyclic-acetamide thus prepared may be dehydrated to give the 2-aminomethyl-2-heterocyclic-acetonitrile intermediates in procedure V.

Also, the NH-lower alkyl and NH-$(CH_2)_n$-cycloalkyl thioamides prepared by procedures III and IV may be converted to the corresponding N-unsubstituted compounds by treating with ammonium hydroxide.

The pharmaceutically acceptable, acid addition salts of the compounds of Formula I are formed with organic and inorganic acids by methods known to the art. For example, the base is reacted with an organic or inorganic acid in aqueous miscible solvent, such as acetone or ethanol, with isolation of the salt by concentration and cooling or in aqueous immiscible solvent, such as ethyl ether or chloroform, with the desired salt separating directly. Exemplary of the salts which are included in this invention are maleate, fumarate, succinate, oxalate, benzoate, methanesulfonate, ethanedisulfonate, benzenesulfonate, acetate, propionate, tartrate, citrate, hydrochloride, hydrobromide, sulfate, sulfamate, phosphate and nitrate salts.

The compounds of this invention are administered internally either parenterally, rectally or, preferably, orally in an amount to produce the desired biological activity.

Preferably, the compounds are administered in conventional dosage forms prepared by combining an appropriate dose of the compound with standard pharmaceutical carriers.

The pharmaceutical carrier may be for example a solid or a liquid. Exemplary of solid carriers are lactose, magnesium stearate, terra alba, sucrose, talc, stearic acid, gelatin, agar, pectin, acacia or cocoa butter. The amount of solid carrier will vary widely but preferably will be from about 25 mg. to about 1 gm. Exemplary of liquid carriers are syrup, peanut oil, olive oil, sesame oil, propylene glycol, polyethylene glycol (mol. wt. 200–400) and water. The carrier or diluent may include a time delay material well known to the art such as, for example, glyceryl monostearate or glyceryl distearate alone or with a wax.

A wide variety of pharmaceutical forms can be employed, for example the preparation may take the form of tablets, capsules, powders, suppositories, troches, lozenges, syrups, emulsions, sterile injectable liquids or liquid suspensions or solutions.

The pharmaceutical compositions are prepared by conventional techniques involving procedures such as mixing, granulating and compressing or dissolving the ingredients as appropriate to the desired preparation.

The pharmaceutical compositions of this invention contain a compound of Formula I or a pharmaceutically acceptable acid addition salt thereof in an amount of from about 10 mg. to about 500 mg. The active ingredient will preferably be administered in equal doses 1 to 5 times per day.

The methods of inhibiting gastric acid secretion in accordance with this invention comprise administering internally to an animal an effective amount of a compound of Formula I or a pharmaceutically acceptable acid addition salt thereof. The active ingredient will preferably be administered in dosage unit form as described above. Preferably, the active ingredient will be administered in a total daily dosage of from about 10 mg. to about 2500 mg. When the administration is carried out as described above, gastric acid secretion is inhibited.

One skilled in the art will recognize that in determining the amounts of the active ingredient in the claimed compositions and used in the claimed methods, the activity of the chemical ingredient as well as the size of the host animal must be considered.

The terms "lower alkyl" and "lower alkoxy" where used herein denote groups having 1–4 carbon atoms and "halogen" denotes chloro, bromo or fluoro.

The following examples are not limiting but are illustrative of the compounds of this invention and processes for their preparation.

EXAMPLE 1

To cold 2-pyridinecarboxaldehyde (21.4 g., 0.2 mole) is added dimethylamine (22.5 g. of a 40% aqueous solution, 0.2 mole) and the solution is neutralized with concentrated hydrochloric acid. To the stirred neutralized solution is added 14.4 g. (0.22 mole) of potassium cyanide. The mixture is stirred overnight, then diluted with water, transferred to a separatory funnel and repeatedly extracted with chloroform. The combined chloroform extracts are washed three times with water, once with brine and dried over magnesium sulfate. The mixture is filtered, the solvent is removed under reduced pressure and methanol is added to the residue. The mixture is allowed to stand at $-20°$ C. for 18 hours, then filtered. The filtrate is concentrated and distilled *in vacuo* to give 2-dimethylamino-2-(2-pyridyl)acetonitrile.

2-Dimethylamino - 2 - (2 - pyridyl)acetonitrile (11.4 g., 0.07 m.) is dissolved in 200 ml. of dry pyridine containing 5 ml. of anhydrous triethylamine. Hydrogen sulfide is bubbled into the stirred solution for seven hours and the solution is then stirred for 17 hours. This procedure is repeated for five days. Then the mixture is stirred for an additional 48 hours. The solvent is then removed under reduced pressure and the residue is recrystallized from ethanol to give 2-dimethylamino - 2 - (2 - pyridyl)thioacetamide, m.p. 130–133° C. (dec.).

One gram of 2 - dimethylamino - 2 - (2 - pyridyl)thioacetamide in ether is added to ethereal hydrogen chloride. The resulting precipitate is filtered off, washed with ether and recrystallized from ethanol/ether to give 2-dimethylamino - 2 - (2 - pyridyl)thioacetamide dihydrochloride.

EXAMPLE 2

By the procedure of Example 1, using in place of 2-dimethylamnio - 2 - (2 - pyridyl)acetonitrile the following substituted acetonitriles:

2-diethylamino-2-(2-pyridyl)acetonitrile
2-pyrrolidino-2-(2-pyridyl)acetonitrile
2-piperidino-2-(2-pyridyl)acetonitrile
2-dimethylamino-2-(6-methyl-2-pyridyl)acetonitrile the products are, respectively:

2-diethylamino-2-(2-pyridyl)thioacetamide
2-pyrrolidino-2-(2-pyridyl)thioacetamide
2-piperidino-2-(2-pyridyl)thioacetamide
2-dimethylamino-2-(6-methyl-2-pyridyl)thioacetamide.

EXAMPLE 3

Using 0.07 mole of 2-dimethylamino-2-(2-quinolyl)-acetonitrile in place of 2-dimethylamino-2-(2-pyridyl)-acetonitrile in the procedure of Example 1 gives 2-dimethylamino-2-(2-quinolyl)thioacetamide.

Similarly, using 2-piperidino-2-(2-quinolyl)-acetonitrile, the product is 2-piperidino-2-(2-quinolyl)-thioacetamide.

EXAMPLE 4

To 27.0 g. of 2-pyrimidinecarboxaldehyde and 11.3 g. of dimethylamine (neutralized with hydrochloric acid) is added, with stirring and cooling, 17.9 g. of potassium cyanide in a small amount of water. The mixture is allowed to stand overnight and ether is added. Concentrating and distilling the residue gives 2-dimethylamino-2-(2-pyrimidyl)acetonitrile.

Using 2 - dimethylamino-2-(2-pyrimidyl)acetonitrile in place of 2-dimethylamino - 2 - (2-pyridyl)acetonitrile in the procedure of Example 1 gives 2-dimethylamino-2-(2-pyrimidyl)-thioacetamide.

EXAMPLE 5

By the procedure of Example 1, using in place of 2-pyridinecarboxaldehyde, the following carboxaldehydes:

2-pyrrolecarboxaldehyde
2-pyrazinecarboxaldehyde
4-pyrimidinecarboxaldehyde
2-thiazolecarboxaldehyde
4-thiazolecarboxaldehyde the products are, respectively:

2-dimethylamino-2-(2-pyrrolyl)thioacetamide
2-dimethylamino-2-(2-pyrazinyl)thioacetamide
2-dimethylamino-2-(4-pyrimidyl)thioacetamide
2-dimethylamino-2-(2-thiazolyl)thioacetamide
2-dimethylamino-2-(4-thiazolyl)thioacetamide.

EXAMPLE 6

By the procedure of Example 1, using dipropylamine in place of dimethylamine the product is 2-dipropylamino-2-(2-pyridyl)thioacetamide.

Similarly, using dibutylamine, the product is 2-dibutylamino-2-(2-pyridyl)thioacetamide.

EXAMPLE 7

By the procedure of Example 1, 2-pyridinecarboxaldehyde is reacted with N-methylpiperazine and potassium cyanide to give 2-(4-methylpiperazino)-2-(2-pyridyl)acetonitrile.

Hydrogen sulfide is bubbled into a stirred solution of 12.0 g. of 2-(4-methylpiperazino)-2-(2-pyridyl)acetonitrile in 200 ml. of dry pyridine and 5 ml. of anhydrous triethylamine for seven hours. The mixture is then stirred for 17 hours. This procedure is repeated for five days and the mixture is worked up as in Example 1 to give 2-(4-methylpiperazino)-2-(2-pyridyl)-thioacetamide.

Similarly, using in place of N-methylpiperazine the following alkylpiperazines:

N-ethylpiperazine
N-propylpiperazine
N-butylpiperazine the products are, respectively:

2-(4-ethylpiperazino)-2-(2-pyridyl)thioacetamide
2-(4-propylpiperazino)-2-(2-pyridyl)thioacetamide
2-(4-butylpiperazino)-2-(2-pyridyl)thioacetamide.

EXAMPLE 8

To 4.1 g. (0.03 mole) of 2-(2-pyridyl)acetamide dissolved in 60 ml. of methanol is added 2.52 g. of 37% aqueous formaldehyde solution (0.03 mole of formaldehyde) dissolved in 15 ml. of methanol and 1.35 g. (0.03 mole) of dimethylamine dissolved in 15 ml. of methanol. The resulting solution is warmed on a steam bath for 15 minutes. The solvent is then removed under reduced pressure and the residue is recrystallized from acetone to give 3-dimethylamino-2-(2-pyridyl)propanamide.

Phosphorus pentasulfide (2.3 g.) is added to 2.0 g. of 3-dimethylamino - 2 - (2-pyridyl)propanamide in 25 ml. of pyridine. The mixture is heated on a steam bath for two hours, then 250 ml. of water and 10 ml. of 5% aqueous sodium hydroxide solution is added. The mixture is extracted with chloroform and the extracts are dried and concentrated and the residue is recrystallized to give 3-dimethylamino-2-(2-pyridyl)thiopropanamide.

EXAMPLE 9

By the procedure of Example 8, using in place of dimethylamine, the following:

diethylamine
dipropylamine
dibutylamine
pyrrolidine
piperidine
N-methylpiperazine the products are, respectively:

3-diethylamino-2-(2-pyridyl)thiopropanamide
3-dipropylamino-2-(2-pyridyl)thiopropanamide
3-dibutylamino-2-(2-pyrdyl)thiopropanamide
3-pyrrolidino-2-(2-pyridyl)thiopropanamide
3-piperidino-2-(2-pyridyl)thiopropanamide
3-(4-methylpiperazino)-2-(2-pyridyl)thiopropanamide.

EXAMPLE 10

By the procedure of Example 8, using 2-(5-ethyl-2-pyridyl)acetamide, the product is 3-dimethylamino-2-(5-ethyl-2-pyridyl)thiopropanamide.

EXAMPLE 11

A solution of 7.6 g. (0.05 mole) of 2-2(2-pyridyl)-thioacetamide in a 40% aqueous solution of cyclopropylamine is refluxed for 45 minutes. After cooling, approximately 30 ml. of water is added. The reaction mixture is extracted three times with chloroform. The extracts are combined and dried over magnesium sulfate. The solvent is removed under reduced pressure. The residue is recrystallized twice from ethyl acetate/hexane to give N-cyclopropyl-2-(2-pyridyl)thioacetamide.

By the procedure of Example 8, 0.02 mole of N-cyclopropyl-2-(2-pyridyl)thioacetamide is warmed on a steam bath with 0.02 mole of formaldehyde and 0.02 mole of dimethylamine in methanol for 15 minutes to give, after removing the solvent and recrystallizing the residue, N-cyclopropyl-3-dimethylamino - 2 - (2-pyridyl)thiopropanamide.

Similarly, using the above procedure the following cycloalkylamines:

cyclobutylamine
cyclopentylamine
cyclohexylamine the products are, respectively:

N-cyclobutyl-3-dimethylamino-2-(2-pyridyl)thiopropanamide
N-cyclopentyl-3-dimethylamino-2-(2-pyridyl)thiopropanamide
N-cyclohexyl-3-dimethylamino-2-(2-pyridyl)thiopropanamide.

EXAMPLE 12

Cyclopropanemethylamine hydrochloride (6.02 g. 0.056 mole) and 4.71 g. (0.056 mole) of sodium bicarbonate are dissolved in 75 ml. of water and the solution is added to 4.35 g. (0.029 mole) of 2-(2-pyridyl)thioacetamide. The reaction mixture is heated on a steam bath with stirring for four hours. The mixture is then cooled and 25 ml. of water is added. The reaction mixture is extracted three times with chloroform. The chloroform extracts are combined, dried over magnesium sulfate and then evaporated. The residue is purified by "dry-column" chromatography on silica gel, using ethyl acetate as solvent. The product is recrystallized from ethyl acetate/hexane to give N-cyclopropanemethyl-2-(2-pyridyl)thioacetamide.

By the procedure of Example 8, 0.01 mole of N-cyclopropanemethyl-2-(2-pyridyl)thioacetamide is warmed on a steam bath with 0.01 mole of formaldehyde and 0.01 mole of dimethylamine in methanol for 15 minutes to give, after removing the solvent and recrystallizing the residue, N - cyclopropanemethyl - 3 - dimethylamino-2-(2-pyridyl)thiopropanamide.

Similarly, using in place of cyclopropanemethylamine hydrochloride the following:

cyclobutanemethylamine hydrochloride
cyclopentanemethylamine hydrochloride
cyclohexanemethylamine hydrochloride the products are, respectively:

N-cyclobutanemethyl-3-dimethylamino-2-(2-pyridyl)thiopropanamide
N-cyclopentanemethyl-3-dimethylamino-2-(2-pyridyl)thiopropanamide
N-cyclohexanemethyl-3-dimethylamino-2-(2-pyridyl)thiopropanamide.

EXAMPLE 13

By the procedure described in Example 11, the following thioacetamides are reacted with formaldehyde and dimethylamine:

N-methyl-2-(2-pyridyl)thioacetamide
N-methyl-2-(2-quinolyl)thioacetamide
N-ethyl-2-(6-methyl-2-pyridyl)thioacetamide
N-propyl-2-(6-methyl-2-pyridyl)thioacetamide
N-butyl-2-(6-methyl-2-pyridyl)thioacetamide
N-methyl-2-(4-ethoxy-2-pyridyl)thioacetamide
N,N-dimethyl-2-(2-pyridyl)thioacetamide
N,N-diethyl-2-(6-methyl-2-pyridyl)thioacetamide to give the following products, respectively:

3-dimethylamino-N-methyl-2-(2-pyridyl)thiopropanamide
3-dimethylamino-N-methyl-2-(2-quinolyl)thiopropanamide
3-dimethylamino-N-ethyl-2-(6-methyl-2-pyridyl)thiopropanamide
3-dimethylamino-N-propyl-2-(6-methyl-2-pyridyl)thiopropanamide
N-butyl-3-dimethylamino-2-(6-methyl-2-pyridyl)thiopropanamide
3-dimethylamino-N-methyl-2-(4-ethoxy-2-pyridyl)thiopropanamide
3-dimethylamino-N,N-dimethyl-2-(2-pyridyl)thiopropanamide
3-dimethylamino-N,N-diethyl-2-(6-methyl-2-pyridyl)thiopropanamide.

EXAMPLE 14

By the procedure of Example 11, using cyclopropylamine and the following thioacetamides:

2-(2-pyrazinyl)thioacetamide
2-(2-pyrrolyl)thioacetamide
2-(2-quinolyl)thioacetamide the products, are respectively:

N-cyclopropyl-3-dimethylamino-2-(2-pyrazinyl)thiopropanamide
N-cyclopropyl-3-dimethylamino-2-(2-pyrrolyl)thiopropanamide
N-cyclopropyl-3-dimethylamino-2-(2-quinolyl)thiopropanamide.

EXAMPLE 15

By the procedure of Example 12, using cyclopropanemethylamine hydrochloride and the following thioacetamides:

2-(2-pyrazinyl)thioacetamide
2-(2-pyrrolyl)thioacetamide
2-(2-quinolyl)thioacetamide the products are, respectively:

N-cyclopropanemethyl-3-dimethylamino-2-(2-pyrazinyl)thiopropanamide
N-cyclopropanemethyl-3-dimethylamino-2-(2-pyrrolyl)thiopropanamide
N-cyclopropanemethyl-3-dimethylamino-2-(2-quinolyl)thiopropanamide.

EXAMPLE 16

By the procedure of Example 1, using 4-chloro-2-pyridinecarboxaldehyde in place of 2-pyridinecarboxaldehyde, the product is 2-(4-chloro-2-pyridyl)-2-(dimethylamino)thioacetamide.

EXAMPLE 17

A mixture of 7.5 g. of 2-dimethylamino-2-(2-pyridyl)thioacetamide and 15 ml. of 30% aqueous methylamine is heated for 30 minutes, then cooled and 25 ml. of 5% aqueous sodium carbonate solution is added. The solution is extracted with chloroform, the organic solution is dried and concentrated and the residue is recrystallized to give 2-dimethylamino-N-methyl-2-(2-pyridyl)thioacetamide.

By the same procedure, using the appropriate lower alkylamine, 2-dimethylamino-N-ethyl-2-(2-pyridyl)thioacetamide and the corresponding N-propyl and N-butyl compounds are prepared.

Similarly, using the appropriate di-(lower alkyl)amine, 2-dimethylamino-N,N-dimethyl - 2 - (2-pyridyl)thioacetamide and the corresponding N,N-diethyl, N-dipropyl and N,N-dibutyl compounds are prepared.

Also, using 2-dimethylamino-2-(2-pyrimidyl)thioacetamide and methylamine, the product is 2-dimethylamino-N-methyl-2-(2-pyrimidyl)thioacetamide. Similarly, using dimethylamine, the product is 2-dimethylamino-N,N-dimethyl-2-(2-pyrimidyl)thioacetamide.

EXAMPLE 18

A mixture of 2-dimethylamino-2-(2-pyridyl)thioacetamide and 40% aqueous solution of cyclopropylamine is heated at reflux for 45 minutes and worked up by the procedure described in Example 11 to give N-cyclopropyl-2-dimethylamino-2-(2-pyridyl)thioacetamide.

By the same procedure, using 2-piperidino-2-(2-pyridyl)thioacetamide, the product is N-cyclopropyl-2-piperidino-2-(2-pyridyl)thioacetamide.

EXAMPLE 19

To 5.65 g. of 2-dimethylamino-2-(2-pyridyl)thioacetamide is added 6.02 g. of cyclopropanemethylamine hydrochloride and 4.71 g. of sodium bicarbonate which are dissolved in 75 ml. of water and the resulting mixture is heated with stirring on a steam bath for four hours to give, after working up by the procedure described in Example 12, N-cyclopropanemethyl-2-dimethylamino-2-(2-pyridyl)thioacetamide.

By the same procedure, using cyclopentanemethylamine hydrochloride, the product is N-cyclopentanemethyl-2-dimethylamino-2-(2-pyridyl)thioacetamide.

EXAMPLE 20

Alternatively, N-cyclopropanemethyl-2-dimethylamino-2-(2-pyridyl)thioacetamide is prepared by the following procedure.

A solution of 13.6 g. (0.1 mole) of 2-(dimethylaminomethyl)pyridine in 50 ml. of anhydrous benzene is added dropwise at 25° C. to 8.7 g. (0.1 mole) of phenyl lithium in 100 ml. of anhydrous benzene. After the addition, the reaction is stirred for 30 minutes and 11.3 g. (0.1 mole) of cyclopropanemethyl isothiocyanate in 50 ml. of anhydrous benzene is added dropwise. The mixture is stirred at 25° C. for 15 hours, then decomposed with dilute hydrochloric acid. The layers are separated and the aqueous layer is basified with aqueous sodium carbonate solution. Extraction with chloroform, removal of the chloroform from the extract and recrystallization gives N-cyclopropanemethyl-2-dimethylamino-2 - (2 - pyridyl)thioacetamide.

EXAMPLE 21

By the procedure of Example 20, using 2-(piperidinomethyl)pyridine in place of 2-(dimethylaminomethyl)pyridine, the product is N-cyclopropanemethyl-2-piperidino-2-(2-pyridyl)thioacetamide.

EXAMPLE 22

Three grams of 2-dimethylamino-2-(2-pyridyl)thioacetamide in ether is added to ethereal hydrogen chloride and the resulting precipitate is filtered off, washed with ether and recrystallized from ethanol/ether to give 2-dimethylamino-2 - (pyridyl)thioacetamide dihydrochloride.

Similarly, using N-cyclopropyl-2-dimethylamino-2-(2-pyridyl)thioacetamide, the dihydrochloride salt of N-N-cyclopropyl-2-dimethylamino-2 - (2 - pyridyl)thioacetamide is prepared.

EXAMPLE 23

2-Dimethylamino-2-(2-pyridyl)thioacetamide (2 g.) in ethanol is treated with an equimolar amount of maleic acid in ethanol to give, after removing the solvent *in vacuo*, 2-dimethylamino - 2 - (2 - pyridyl(thioacetamide maleate.

In the same manner, using citric acid, 2-dimethylamino-2-(2-pyridyl)thioacetamide citrate is prepared.

EXAMPLE 24

Ingredients: Amounts, mg.
2 - Dimethylamino - 2 - (2 - pyridyl)thioacetamide dihydrochloride _____ 200
Lactose _____ 100
Magnesium stearate _____ 5

The ingredients are mixed and filled into a hard gelatin capsule.

EXAMPLE 25

Ingredients: Amounts, mg.
2-Dimethylamino-N-methyl - 2 - (2 - pyridyl)thioacetamide _____ 100
Calcium sulfate dihydrate _____ 125
Sucrose _____ 25
Starch _____ 15
Talc _____ 5
Stearic acid _____ 3

The sucrose, calcium sulfate dihydrate and 2-dimethylamino - N - methyl - 2 - (2 - pyridyl)thioacetamide are thoroughly mixed and granulated with 10% gelatin solution. The wet granules are screened, dried and then mixed with the starch, talc and stearic acid, screened and compresented into a tablet.

The compositions prepared as in Examples 24 and 25 are administered orally to a subject having excessive gastric acid secretion within the dose ranges given hereabove.

What is claimed is:

1. A pharmaceutical composition having gastric acid secretion inhibitory activity, in dosage unit form comprising a pharmaceutical carrier and a gastric acid secretion inhibiting amount of a thioacetamide compound of the formula:

$$\begin{array}{c} S \\ \| \\ R_1-CH-C-R_4 \\ | \\ (CH_2)_m \\ | \\ N \\ / \ \backslash \\ R_2 \quad R_3 \end{array}$$

in which:
  $m$ is 0 or 1;
  $R_1$ is a 2-pyridyl ring, said ring being optionally substituted by halogen, lower alkyl or lower alkoxy;
  $R_2$ and $R_3$ are lower alkyl or taken together with the nitrogen atom to which they are attached form a piperidino, pyrrolidino or N-lower alkylpiperazino ring;

$$R_4 \text{ is } N \begin{array}{c} R_5 \\ \diagup \\ \diagdown \\ R_6 \end{array}$$

or NH-$(CH_2)_n$-cycloalkyl, said cycloalkyl having 3–6 carbon atoms;
  $R_5$ and $R_6$ are hydrogen or lower alkyl and
  $n$ is 0 or 1
or a pharmaceutically acceptable acid addition salt thereof.

2. The pharmaceutical composition of claim 1 in which $R_1$ is 2-pyridyl, $R_2$ and $R_3$ are methyl or ethyl or taken together with the nitrogen atom to which they are attached form a piperidino or pyrrolidino ring and $R_4$ is $NH_2$, NH-(lower alkyl), NH-cyclopropyl, NH-cyclobutyl, NH-CH$_2$-cyclopropyl or NH-CH$_2$-cyclobutyl.

3. The pharmaceutical composition of claim 1 in which $R_1$ is 2-pyridyl, $R_2$ and $R_3$ are methyl and $R_4$ is $NH_2$, NH-methyl, NH-cyclopropyl, NH-cyclobutyl, NH-CH$_2$-cyclopropyl or NH-CH$_2$-cyclobutyl.

4. The pharmaceutical composition of claim 1 containing 2-dimethylamino-N-methyl-2 - (2 - pyridyl)thioacetamide.

5. The pharmaceutical composition of claim 1 in which the thioacetamide compound is present in an amount of from about 10 mg. to about 500 mg.

6. A method of inhibiting gastric acid secretion in an animal in need thereof which comprises administering internally to said animal an effective amount of a thioacetamide compound of the formula:

$$\begin{array}{c} S \\ \| \\ R_1-CH-C-R_4 \\ | \\ (CH_2)_m \\ | \\ N \\ / \ \backslash \\ R_2 \quad R_3 \end{array}$$

in which:
  $m$ is 0 or 1;
  $R_1$ is a 2-pyridyl ring, said ring being optionally substituted by halogen, lower alkyl or lower alkoxy;
  $R_2$ and $R_3$ are lower alkyl or taken together with the nitrogen atom to which they are attached form a piperidino, pyrrolidino or N-lower alkylpiperazino ring;

$R_4$ is 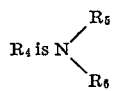

or NH-$(CH_2)_n$-cycloalkyl, said cycloalkyl having 3-6 carbon atoms;

$R_5$ and $R_6$ are hydrogen or lower alkyl and $n$ is 0 or 1 or a pharmaceutically acceptable acid addition salt thereof.

7. The method of claim 6 in which $R_1$ is 2-pyridyl, $R_2$ and $R_3$ are methyl or ethyl or taken together with the nitrogen atom to which they are attached form a piperidino or pyrrolidino ring and $R_4$ is $NH_2$, NH-(lower alkyl), NH-cyclopropyl, NH-cyclobutyl, NH-$CH_2$-cyclopropyl or NH-$CH_2$-cyclobutyl.

8. The method of claim 6 in which $R_1$ is 2-pyridyl, $R_2$ and $R_3$ are methyl and $R_4$ is $NH_2$, NH-methyl, NH-cyclopropyl, NH-cyclobutyl, NH-$CH_2$-cyclopropyl or NH-$CH_2$-cyclobutyl.

9. The method of claim 6 in which 2-dimethylamino-N-methyl-2-(2-pyridyl)thioacetamide is administered.

10. The method of claim 6 in which the thioacetamide compound is administered in a daily dosage of from about 10 mg. to about 2500 mg.

References Cited
UNITED STATES PATENTS 3,686,190   8/1972   Malen _____ 424—263 X ALBERT T. MEYERS, Primary Examiner F. E. WADDELL, Assistant Examiner U.S. Cl. X.R.

424—250, 251, 258, 267, 270, 274

UNITED STATES PATENT OFFICE
CERTIFICATE OF CORRECTION

Patent No. 3,842,173    Dated October 15, 1974

Inventor(s) L. Martin Brenner and Bernard Loev

It is certified that error appears in the above-identified patent and that said Letters Patent are hereby corrected as shown below:

Column 1, lines 29-35, the formula should appear as follows:

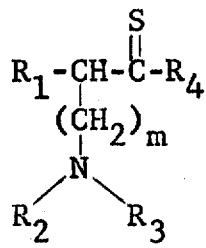

Column 1, line 39, "2-pyridyl-2-pyrimidyl," should read -- 2-pyridyl, 2-pyrimidyl, -- .

Column 1, line 54, " 1; " should read -- 1. -- .

Column 3, line 1, " NH-CH$_2$)$_n$- " should read -- NH-(CH$_2$)$_n$- -- .

Column 6, line 60, " 2-2(2-pyridyl)- " should read -- 2-(2-pyridyl)- -- .

Column 9, at the end of line 47, delete " N- " .

Column 9, line 54, " (2-pyridyl(thioacetamide " should read -- (2-pyridyl)thioacetamide -- .

Column 10, line 13, between "form" and "comprising" insert a comma.

Signed and sealed this 17th day of December 1974.

(SEAL)
Attest:

McCOY M. GIBSON JR.
 Attesting Officer

C. MARSHALL DANN
 Commissioner of Patents